United States Patent
Ido et al.

(10) Patent No.: US 8,687,515 B2
(45) Date of Patent: Apr. 1, 2014

(54) RECEPTION DEVICE AND METHOD OF DETERMINING THE VELOCITY OF THE DEVICE BASED ON A RECEIVED PILOT SIGNAL

(75) Inventors: Jun Ido, Tokyo (JP); Naotoshi Maeda, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 144 days.

(21) Appl. No.: 13/394,517

(22) PCT Filed: Mar. 17, 2010

(86) PCT No.: PCT/JP2010/001900
§ 371 (c)(1),
(2), (4) Date: Mar. 6, 2012

(87) PCT Pub. No.: WO2011/055466
PCT Pub. Date: May 12, 2011

(65) Prior Publication Data
US 2012/0170480 A1    Jul. 5, 2012

(30) Foreign Application Priority Data

Nov. 9, 2009    (JP) .............................. 2009-256018

(51) Int. Cl.
*H04J 1/16*    (2006.01)

(52) U.S. Cl.
USPC ........................ 370/252; 370/329; 370/339

(58) Field of Classification Search
None
See application file for complete search history.

(56) References Cited

U.S. PATENT DOCUMENTS

| | | | |
|---|---|---|---|
| 2005/0105647 A1* | 5/2005 | Wilhelmsson et al. | 375/316 |
| 2005/0267370 A1* | 12/2005 | Park et al. | 600/454 |
| 2009/0310479 A1* | 12/2009 | Kisoda et al. | 370/210 |

FOREIGN PATENT DOCUMENTS

| | | |
|---|---|---|
| JP | 7-140232 A | 6/1995 |
| JP | 8-015417 A | 1/1996 |
| JP | 9-294096 A | 11/1997 |
| JP | 2000-286821 A | 10/2000 |
| JP | 2001-211119 A | 8/2001 |
| JP | 3212607 B2 | 9/2001 |
| JP | 2001-292122 A | 10/2001 |
| JP | 2006-140987 A | 6/2006 |
| JP | 2006-157663 A | 6/2006 |
| JP | 2007-028201 A | 2/2007 |
| JP | 2007-235305 A | 9/2007 |
| JP | 2007-243698 A | 9/2007 |
| JP | 2008-537417 A | 9/2008 |
| JP | 2008-244843 A | 10/2008 |
| JP | 2008-271302 A | 11/2008 |
| JP | 2009-500885 A | 1/2009 |
| WO | WO 94/19704 A1 | 9/1994 |
| WO | WO 2006/111277 A1 | 10/2006 |
| WO | WO 2007-003715 A1 | 1/2007 |

* cited by examiner

*Primary Examiner* — Ian N Moore
*Assistant Examiner* — Eric P Smith
(74) *Attorney, Agent, or Firm* — Birch, Stewart, Kolasch & Birch, LLP

(57) ABSTRACT

A channel characteristic obtained from a pilot signal is stored for a prescribed number of symbols and a Fourier transform is performed (1), the power of each Doppler frequency component is calculated (2), filtering is performed in the time direction for each Doppler frequency component (3), noise components are masked (4), power changes between mutually adjacent Doppler frequency components are emphasized (5), and motion information is generated by comparison with a predetermined decision threshold (6). Velocity detection that detects velocity of motion from a received signal with high precision in order to improve mobile reception performance by optimizing demodulation operations according to velocity of motion thereby becomes possible.

12 Claims, 6 Drawing Sheets

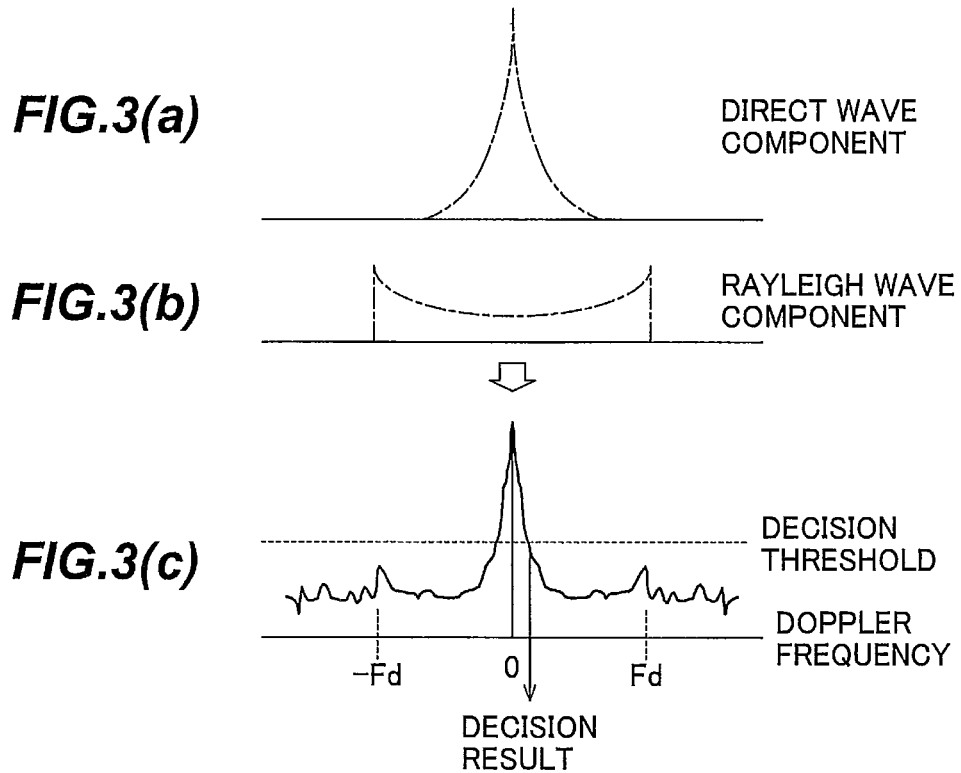
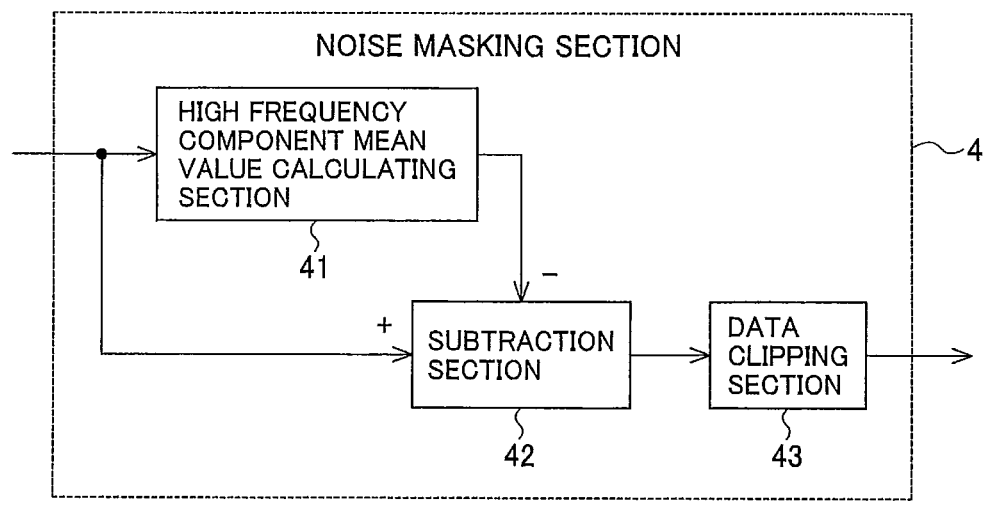

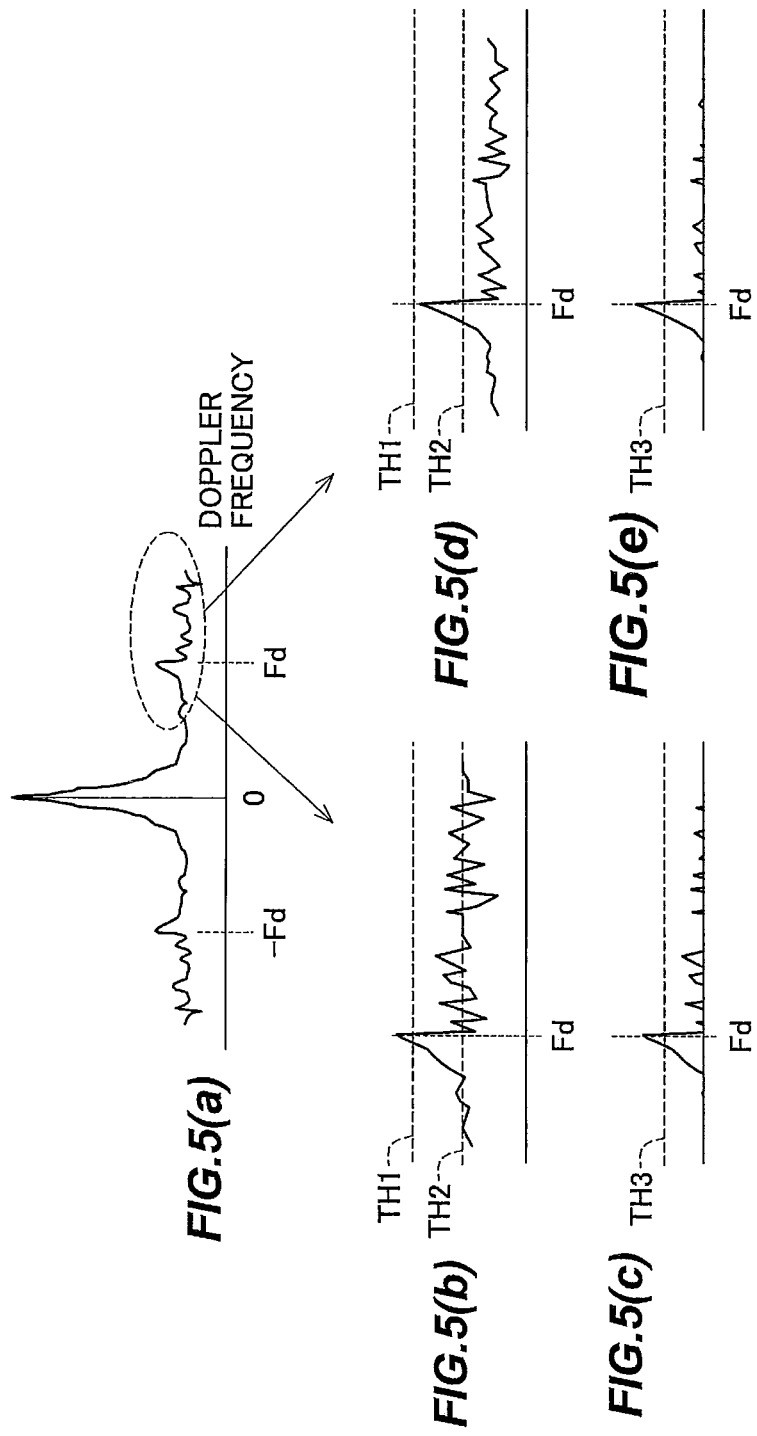

RECEPTION DEVICE AND METHOD OF DETERMINING THE VELOCITY OF THE DEVICE BASED ON A RECEIVED PILOT SIGNAL

TECHNICAL FIELD

The present invention relates to a reception device and reception method that detect the velocity of motion of the reception device from a received signal and control demodulation operations.

BACKGROUND ART

When a signal transmitted by a transmitting station is received by a mobile device, in general, the faster the velocity of motion of the mobile device is, the greater the signal degradation due to fading becomes, making the desired receiving performance difficult to obtain. Transmitting and receiving methods that reduce degradation in the quality of the demodulated signal are therefore applied, e.g., by employing a modulation system with high fading immunity, a typical method being DQPSK (Differential Quadrature Phase Shift Keying), or by applying waveform equalization techniques with high resistance to fading in the receiver.

Another proposed technique is to improve reception performance by controlling demodulation operations according to the velocity of motion. For example, a method proposed in patent documents 1 and 2 is to detect velocity of motion by using the GPS (Global Positioning System), a gyroscope, a velocimeter, or the like, and control demodulation operations according to the result.

Another proposed technique utilizes the fact that the velocity of motion of a mobile device, and changes in that velocity appear in the received signal as temporal variations in channel characteristics, to detect the velocity of motion of the mobile device from the received signal, and to optimize demodulation operations in the reception device according to the velocity information, thereby to improve the reception performance.

For example, in demodulating the synchronously modulated subcarriers used in the QPSK (Quadrature Phase Shift Keying) and QAM (Quadrature Amplitude Modulation) systems, a reception device (see, for example, patent document 3) for receiving the orthogonal frequency-division multiplexed signals employed in terrestrial digital broadcasting or the like estimates the amplitude and phase variations of each subcarrier that occur in the channel (this will also be referred to below as channel estimation) by using a known signal (also referred to below as a pilot signal) inserted into the transmitted signal, and adjusts the amplitude and phase of the subcarriers on the basis of the estimation result (this will also be referred to below as equalization).

To optimize demodulation operations by tracking temporal variations in channel characteristics, a proposed system detects the amplitude variations in the received signal from a CP (Continual Pilot), TMCC (Transmission and Multiplexing Configuration Control), or AC (Auxiliary Channel) signal or some other signal inserted into the transmitted signal at a fixed amplitude, and controls the channel estimation method according to the result (see, for example, patent document 4).

Furthermore, patent document 5 describes a method of detecting velocity of motion from amplitude and phase variations in a pilot signal.

PRIOR ART REFERENCES

Patent Documents

Patent document 1: Japanese Patent Application Publication No. 2006-157663 (p. 13, FIG. 15)
Patent document 2: Japanese Patent Application Publication No. 2007-235305 (p. 10, FIG. 1)
Patent document 3: Japanese Patent Application Publication No. 2001-292122 (p. 11, FIG. 1)
Patent document 4: Japanese Patent Application Publication No. 2006-140987 (p. 11, FIG. 1)
Patent document 5: Japanese Patent Application Publication No. 2007-243698 (p. 18, FIG. 15)

SUMMARY OF THE INVENTION

Problems to be Solved by the Invention

When demodulation operations are optimized by detecting velocity of motion, if a device such as a GPS device or a gyroscope is used, velocity information of high precision is obtained, but the reception system becomes problematically large.

In regard to methods of detecting velocity of motion from the received signal, the prior art references provide methods of calculation based on amplitude variations and phase variations of a pilot signal. A problem is that such detection is less precise than methods using GPS or the like, so that reception performance may actually be worsened due to erroneous detection, because demodulation operations are not performed appropriately.

In particular, in a Rician channel in which both the direct wave from the transmitting station and a reflected wave are present, because of the effect of the direct wave, temporal variations in channel characteristics are not readily apparent in the received signal, so that there is an increased possibility of the false detection problem in which, although the velocity of motion is high, velocity detection produces a decision that the velocity is low.

This invention addresses the above problems with the object of realizing a velocity detection device and method that detect velocity of motion from a received signal with high precision in order to improve mobile reception performance by optimizing demodulation operations according to velocity of motion.

Means for Solving the Problem

To attain the above object, the reception device according to this invention for receiving a transmitted signal into which a pilot signal is inserted at fixed intervals or a frequency division multiplexed signal in which a pilot signal is transmitted on a particular subcarrier, in either case the pilot signal being a known signal at the receiving end, and detecting the velocity of motion of the reception device from a received signal, comprising:

a Fourier transform means for storing a channel characteristic obtained from the pilot signal for a prescribed number of symbols and performing a Fourier transform;

a power calculation means for calculating power of each Doppler frequency component from an output of the Fourier transform means;

a time-direction filtering means for filtering an output of the power calculation means for each Doppler frequency component in the time direction;

a noise masking means for masking a noise component included in an output of the time-direction filtering means;

an edge enhancement weighting means for emphasizing power changes between mutually adjacent Doppler frequency components in an output of the noise masking means; and an edge decision means for generating motion information from an output of the edge enhancement weighting means and a predetermined decision threshold.

An edge enhancement filtering means for receiving outputs of the noise masking means in order of Doppler frequency magnitude and performing filtering with a filter having a high-pass characteristic may also be provided, and the edge enhancement weighting means may emphasize power changes between mutually adjacent Doppler frequency components in an output of the edge enhancement filtering means.

EFFECT OF THE INVENTION

According to the present invention, velocity of motion can be detected with high precision not only when temporal variations in channel characteristics obtained from the received signal are large, but also in a channel in which there are both a direct wave and a reflected wave, as typified by a Rician channel.

In a configuration in which an edge enhancement filter for emphasizing power changes between adjacent Doppler frequency components is added and an edge enhancement weighting process is then performed, velocity of motion can be detected with high precision not only when time variations in the channel characteristics obtained from the received signal are large, but also in a channel in which there are both a direct wave and a reflected wave, as typified by a Rician channel.

BRIEF DESCRIPTION OF THE DRAWINGS

FIGS. 3(a), 3(b), and 3(c) are diagrams illustrating the power spectrum spread of a received signal that has traversed a fading channel, the fading channel being a Rician channel.

FIG. 4 is a block diagram representing an example of the structure of the noise masking section in FIG. 1.

FIGS. 5(a), 5(b), 5(c), 5(d), and 5(e) are diagrams illustrating the effect of providing the noise masking section.

MODE FOR CARRYING OUT THE INVENTION

First Embodiment

Figure 1:
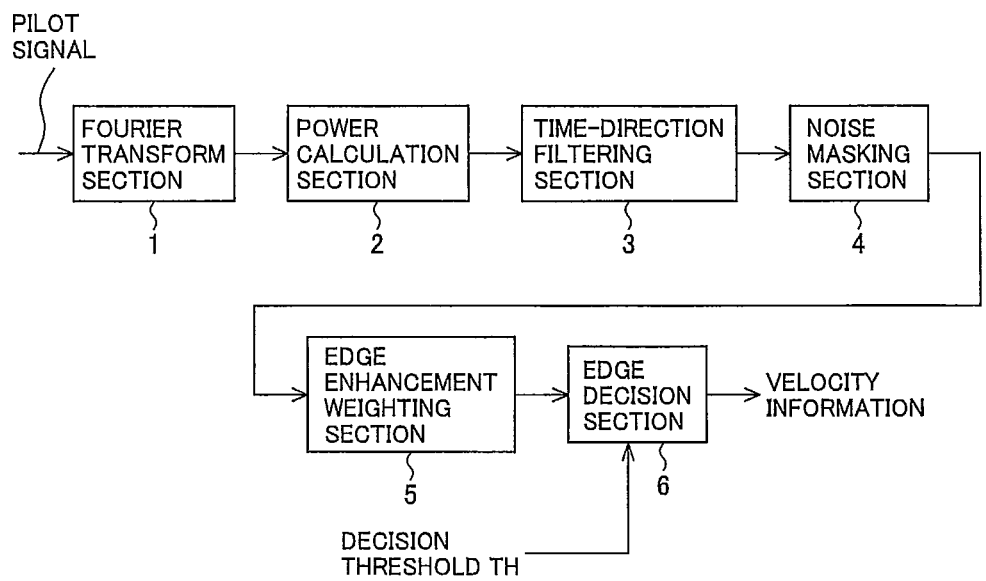
FIG. 1 is a block diagram showing the reception device in a first embodiment of the invention.

FIG. 1 is a block diagram showing a mobile device, e.g., a reception device disposed in a vehicle, in a first embodiment of the invention. This reception device detects the velocity of motion of the reception device from the received signal and thereby controls a demodulation operation.

In FIG. 1, reference numeral 1 denotes a Fourier transform section, 2 a power calculation section, 3 a time-direction filtering section, 4 a noise masking section, 5 an edge enhancement weighting section, and 6 an edge decision section; the output of the edge decision section 6 is velocity information representing the velocity of motion of the moving device.

Next the operation will be described. A pilot signal included in the transmitted signal is input to the Fourier transform section 1.

The pilot signal here is inserted in the transmitted signal at fixed intervals, or is transmitted on a particular subcarrier in a frequency division multiplex transmission system, and is a known signal at the receiving end.

The Fourier transform section 1 calculates a channel characteristic with respect to the pilot signal by dividing the received pilot signal by the known signal, stores this channel characteristic for a prescribed number of symbols (N symbols, where N is a positive integer), performs a Fourier transform to generate N complex signals, and outputs the N complex signals.

Each of the N complex signals obtained as an output from the Fourier transform section 1 represents a component obtained when temporal variations in the received signal are decomposed by frequency, and the frequency which is outside the position where the Doppler frequency is zero and the neighborhood of that position, and has the largest absolute value represents the maximum Doppler frequency component.

The power calculation section 2 calculates the power of each frequency component (also referred to as 'Doppler frequency component' below) from the output of the Fourier transform section 1, and outputs the calculated power.

Figure 2:
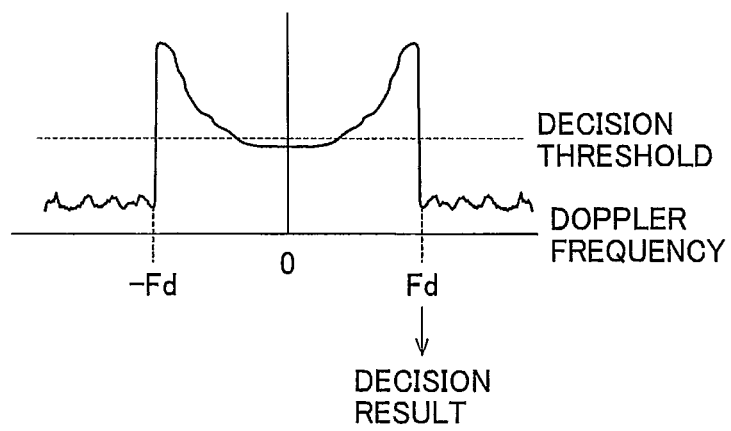
FIG. 2 is a diagram illustrating the power spectrum spread of a received signal that has traversed a fading channel, the fading channel being a single-path Rayleigh channel.

The relationship between the output from the power calculation section 2 and the power spectrum spread of the received signal will now be explained. FIGS. 2 and 3(a) to 3(c) represent the power spread of a received signal that has traversed a fading channel. When the fading channel can be modeled as a single-path Rayleigh channel, the spectrum is spread as shown in FIG. 2. Here Fd and −Fd represent the maximum Doppler frequency, and have the maximum power among the Doppler frequency components.

There is another channel model, known as a Rician channel, for mobile reception of a signal when the transmitting antenna is within line of sight. In this channel, both the direct wave (FIG. 3(a)) and a reflected wave that becomes a Rayleigh fading wave (FIG. 3(b)) are received together, so that the power spectrum spread of the received signal is as shown in FIG. 3(c). Now, because the direct wave component (the direct-current component in FIG. 3(a)), which does not vary over time, accounts for a large proportion of the received signal power, the power of the maximum Doppler frequency component becomes relatively small.

As a method of obtaining velocity information by detecting the maximum Doppler frequency from the output from the power calculation section 2, a conceivable method is to compare the output from the power calculation section 2 with a predetermined threshold value (also referred to below as a decision threshold) and to output the value with the maximum absolute Doppler frequency among the Doppler frequency components larger than the decision threshold as a maximum Doppler frequency detection result. With a single-path Rayleigh channel as in FIG. 2, the maximum Doppler frequency can be readily detected by this method. With a Rician channel as in FIG. 3(a), however, the output of the power calculation section 2 for the maximum Doppler frequency component is comparatively small, and therefore may not exceed the decision threshold. This tendency is particularly evident when the power of the reflected wave is less than the power of the direct wave. If the maximum Doppler frequency component does not exceed the decision threshold value, the decision result indicates a value lower than the true velocity of motion, and this is an obstacle to the optimization of demodulation operations.

The first embodiment is adapted to reduce the effect of noise on the output from the power calculation section 2 and perform an edge enhancement weighting process to emphasize power changes between adjacent Doppler frequency components before detecting the maximum Doppler frequency, so that velocity of motion can be detected with high precision not only when time variations in the channel characteristics obtained from a received signal are large, but also in a channel in which there are both a direct wave and a reflected wave, as typified by a Rician channel.

For this purpose, the time-direction filtering section 3 receives the output from the power calculation section 2 and performs filtering to smooth each Doppler frequency component in the time direction. The effect of noise on each component can thereby be reduced. The noise masking section 4 further reduces the effect of noise on the detection result by masking the noise component included in the output from the time-direction filtering section 3.

The configuration of the noise masking section 4 will now be described with reference to FIG. 4. In FIG. 4, reference numeral 41 denotes a high frequency component mean value calculating section, 42 a subtraction section, and 43 a data clipping section.

From the input to the noise masking section 4, the high frequency component mean value calculating section 41 calculates and outputs a mean value of the absolute values of the components equal to or greater than a predetermined value.

The subtraction section 42 subtracts the mean value obtained by the high frequency component mean value calculating section 41 from the input to the noise masking section 4 for each Doppler frequency component to generate an output signal.

The data clipping section 43 receives the output signal of the subtraction section 42, outputs the received signal directly (without change) when the output signal of the subtraction section 42 is equal to or greater than a predetermined clipping level, and outputs a signal equal to the predetermined clipping level when the output signal of the subtraction section 42 is lower than the clipping level. The clipping level is set to zero or a predetermined positive value.

The effect of providing the noise masking section 4 will be explained with reference to FIGS. 5(a) to 5(e). The case in which the noise masking section 4 and the edge enhancement weighting section 5 are not provided and the output from the time-direction filtering section 3 is supplied directly to the edge decision section 6 will be compared below with the case in which the output from the time-direction filtering section 3 is processed in the noise masking section 4 and then supplied to the edge decision section 6. To simplify the description, the effect of the processing in the edge enhancement weighting section 5 will be ignored.

To detect the maximum Doppler frequency correctly, it is necessary to detect a pronounced signal component on the Doppler frequency axis, but depending on the magnitude of the noise power, it may not be possible to detect the maximum Doppler frequency component correctly.

FIG. 5(a) shows a schematic depiction of Doppler frequency components output from the time-direction filtering section 3 and input to the noise masking section 4.

FIGS. 5(b) and 5(d) show enlarged views of the neighborhood of the maximum Doppler frequency Fd in FIG. 5(a) in the output from the time-direction filtering section 3, and FIGS. 5(c) and 5(e) show enlarged views of the neighborhood of the maximum Doppler frequency Fd in FIG. 5(a) in the output from the noise masking section 4.

The clipping level of the data clipping section 43 in FIG. 4 is assumed to be zero in FIGS. 5(c) and 5(e).

FIGS. 5(b) and 5(c) illustrate a case in which noise power is comparatively large; FIGS. 5(d) and 5(e) illustrate a case in which noise power is comparatively small.

If the noise masking section 4 and the edge enhancement weighting section 5 were not present and the output from the time-direction filtering section 3 (FIGS. 5(b) and 5(d)) were to be input directly to the edge decision section 6, the signals in FIGS. 5(b) and 5(d) would be compared with the decision threshold in the edge decision section 6. If the decision threshold TH is set to the comparatively large value denoted by reference characters TH1 in FIGS. 5(b) and 5(d), when the noise power is large as shown in FIG. 5(b), the maximum Doppler frequency component can be detected without problem, but when the noise power is small as shown in FIG. 5(d), because the maximum Doppler frequency component is smaller than the decision threshold TH1, the maximum Doppler frequency component cannot be detected correctly.

If the decision threshold TH is set to the comparatively small value denoted by reference characters TH2 in FIGS. 5(b) and 5(d), when the noise power is small as shown in FIG. 5(d), the maximum Doppler frequency component can be detected without problem, but when the noise power is large as shown in FIG. 5(b), because components other than the maximum Doppler frequency component, that is, noise power components, are larger than the decision threshold TH2, the maximum Doppler frequency component alone cannot be extracted, so that the maximum Doppler frequency component cannot be detected correctly.

If a signal that has been processed in the noise masking section 4 is supplied to the edge decision section 6 (the effect of edge enhancement weighting by the edge enhancement weighting section 5 is being ignored as described above), Doppler frequency components (FIGS. 5(c) and 5(e)) are compared with the decision threshold TH after the effect of noise components on the Doppler frequency components has been reduced by subtracting a mean value from each Doppler frequency component in the noise masking section 4.

If the decision threshold TH is set to the value denoted by reference characters TH3 in FIGS. 5(c) and 5(e), the maximum Doppler frequency component can be detected correctly both when the noise power is large and when the noise power is small. More specifically, the maximum Doppler frequency can be detected more reliably by reducing signal variations due to the effect of noise by the processing in the noise masking section 4.

Figure 6:
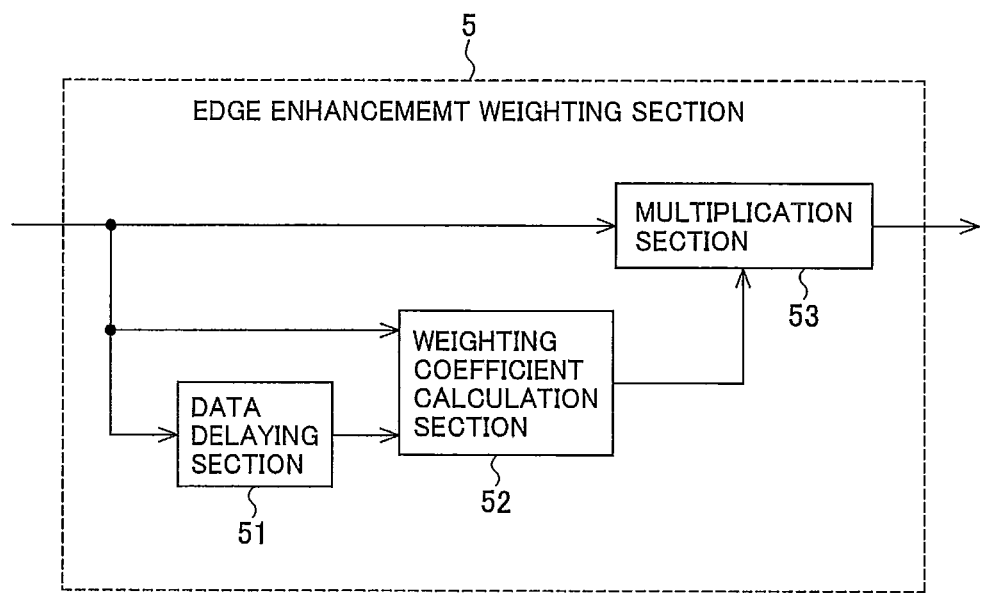
FIG. 6 is a block diagram representing an example of the structure of the edge enhancement weighting section in FIG. 1.

Next, the edge enhancement weighting section 5 performs such a weighting operation as to emphasize power changes between mutually adjacent Doppler frequency components in the output from the noise masking section 4. The edge enhancement weighting section 5 has, for example, a data delaying section 51, a weighting coefficient calculation section 52, and a multiplication section 53 as shown in FIG. 6.

The edge enhancement weighting section 5 receives data representing Doppler frequency components (that have been processed by the noise masking section 4) in order of their frequency magnitude (increasing order or decreasing order of frequency), that is, data representing power at each frequency.

The data delaying section 51 delays the input to the edge enhancement weighting section 5 received in order of Doppler frequency magnitude by a one-datum period, and outputs the delayed data. The weighting coefficient calculation section 52 receives the input to the edge enhancement weighting section 5 and the output from the data delaying section 51 simultaneously. The weighting coefficient calculation section 52 therefore receives data representing each Doppler frequency component, and simultaneously receives data representing the Doppler frequency component adjacent to and lower than that Doppler frequency component. The weighting coefficient calculation section 52 calculates a weighting coefficient for each Doppler frequency component based on the data representing that Doppler frequency component and the data representing a Doppler frequency component adjacent to and lower than that Doppler frequency component. The weighting coefficient calculation section 52 sets the weighting coefficient to '1' when one of the two items of received data representing Doppler frequency components is zero, and outputs the result (MAX/MIN) obtained by dividing the data (MAX) with the larger value by the data (MIN) with the smaller value as the weighting coefficient when neither of the data is zero. The multiplication section 53 multiplies the input to the edge enhancement weighting section 5 (each Doppler frequency component) by the weighting coefficient calculated in the weighting coefficient calculation section 52 for the Doppler frequency component and outputs the result of the multiplication.

The edge decision section 6 compares the output from the edge enhancement weighting section 5 with a predetermined threshold TH, detects, from among the outputs of the edge enhancement weighting section 5 that exceed the decision threshold TH, the output the Doppler frequency of which has the maximum absolute value, and outputs the detection result as velocity information proportional to velocity.

Figure 7A:
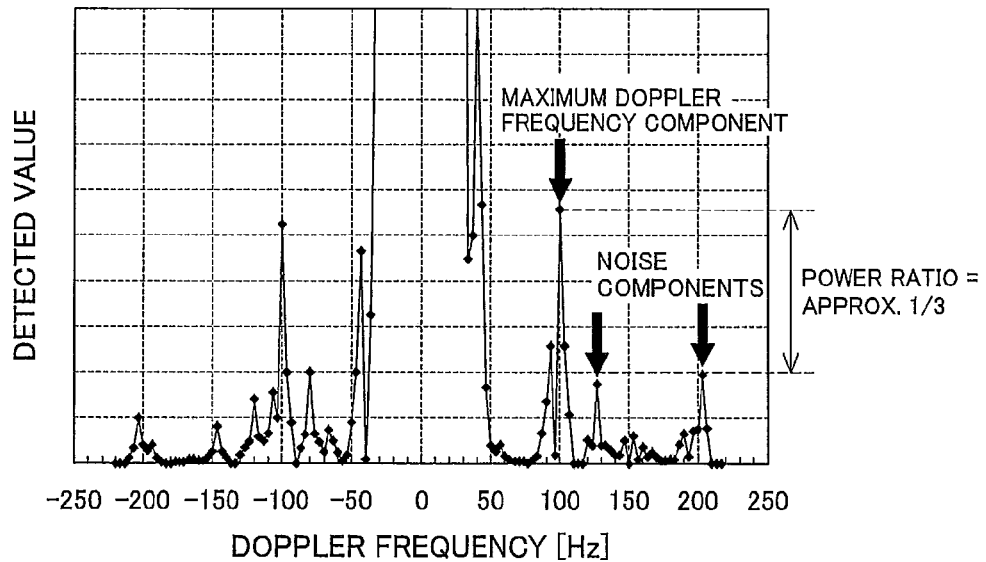
FIGS. 7(a) and 7(b) are diagrams illustrating the effect of providing the edge enhancement weighting section.
Figure 7B:
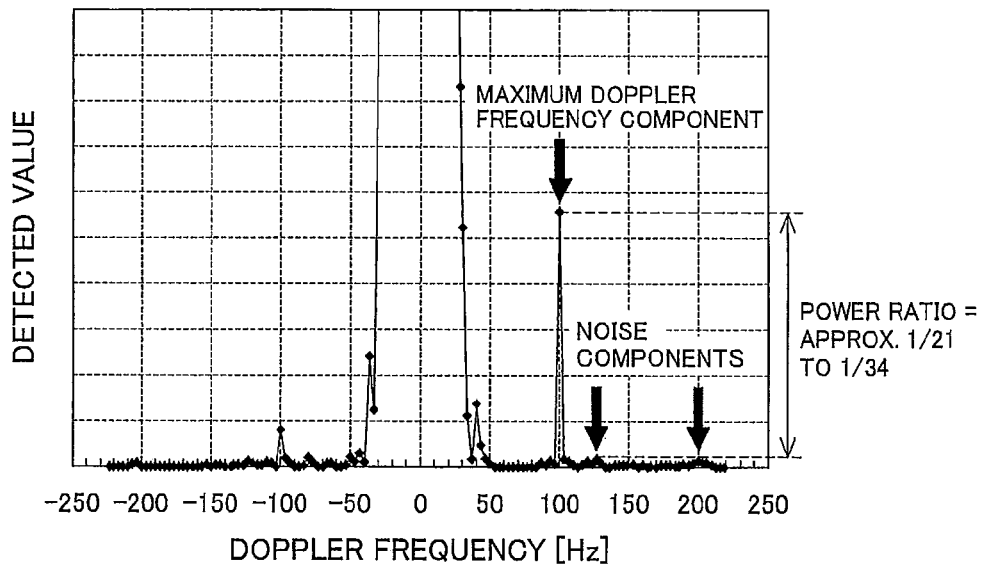

Examples of computer simulation results of the effect of the edge enhancement weighting section 5 are shown in FIGS. 7(a) and 7(b). FIG. 7(a) represents the output signal of the noise masking section 4, in which edge enhancement weighting is yet to be performed. The horizontal axis indicates Doppler frequency, the vertical axis indicates the detected value, and the graph is enlarged so that the differences between the detected values in the high Doppler frequency bands can be distinguished. The channel is a Rician channel, the maximum Doppler frequency is 100 Hz, and the power ratio of the direct wave to the reflected wave is 18 dB.

In the configuration in FIG. 6, the greater the power ratio between adjacent Doppler frequency components is, the greater the weighting coefficient is, and easier the maximum Doppler frequency in the output from the noise masking section 4 can be detected. Noise components with approximately one third the magnitude of the maximum Doppler component are observed in FIG. 7(a), so that there is a strong possibility, depending on the value of the decision threshold TH used in the edge decision section 6, of false detection in which a noise component is decided to be the maximum Doppler frequency component. In FIG. 7(b), however, after weighting, the maximum Doppler frequency component is emphasized and the power of the noise components is one twenty-first to one thirty-fourth of the power of the maximum Doppler frequency component. The probability of false detection is therefore lower than for the non-weighted signal.

As described above, the first embodiment of the present invention reduces the effect of noise by filtering in the time direction and masking in the Doppler frequency direction, and further performs an edge enhancement weighting process to emphasize power changes between adjacent Doppler frequency components before detecting the maximum Doppler frequency. Velocity of motion can thereby be detected with high precision, not only when time variations in the channel characteristics obtained from a received signal are large, but also in a channel in which there are both a direct wave and a reflected wave, as typified by a Rician channel.

Second Embodiment

The first embodiment is configured to improve the precision of detection of the maximum Doppler frequency by use of the edge enhancement weighting section 5. Next, an embodiment that further emphasizes the maximum Doppler frequency component will be shown.

Figure 8:
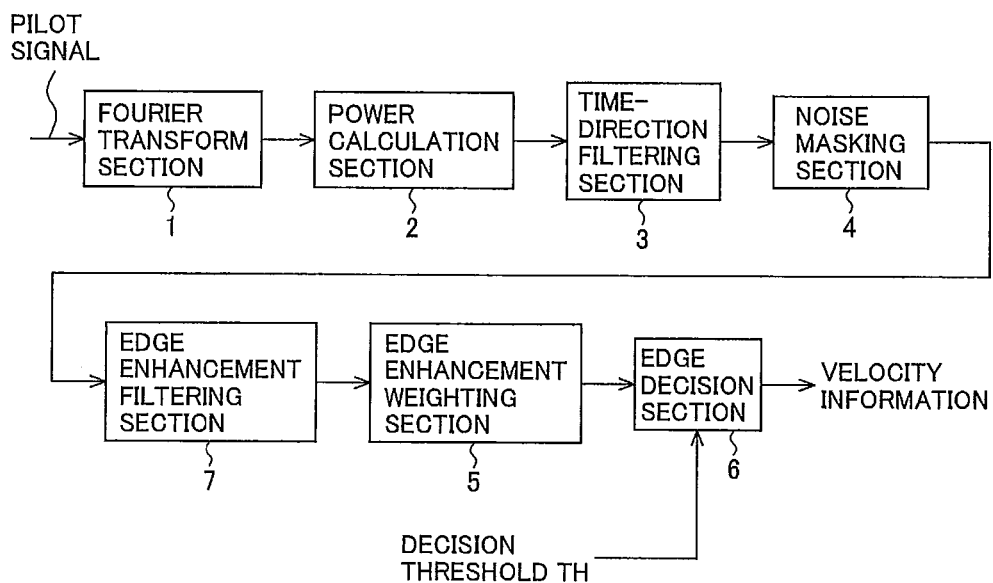
FIG. 8 is a block diagram showing the reception device in a second embodiment of the invention.

FIG. 8 is a block diagram showing a reception device in a second embodiment of the invention. The Fourier transform section 1, power calculation section 2, time-direction filtering section 3, noise masking section 4, edge enhancement weighting section 5, and edge decision section 6 in FIG. 8 are the same as those shown in the first embodiment. An edge enhancement filtering section 7 that receives the output from the noise masking section 4 is added, however, and the edge enhancement weighting section 5 receives the output from the edge enhancement filtering section 7.

The edge enhancement filtering section 7 receives data representing Doppler frequency components (that have been processed by the noise masking section 4), that is, data representing power at each frequency, in order of frequency magnitude (increasing order or decreasing order of frequency), and filters the above input with a filter having a high-pass characteristic.

Next, the operation will be described. Circuit elements with the same reference numerals as in FIG. 1 operate as described in the first embodiment. The edge enhancement filtering section 7 receives the output from the noise masking section 4, and outputs a signal with enhanced edges by performing filtering with a filter having a high-pass characteristic to the next stage. The edge enhancement filtering section 7 may be configured as, for example, a high-pass filter of the FIR (Finite Impulse Response) type.

Because the direct-current component and low-frequency components in the output signal of the noise masking section 4 can be reduced by inserting a filter having a high-pass characteristic ahead of the edge enhancement weighting section 5, the Doppler frequency components obtained as high-frequency components of the signal and the maximum Doppler frequency component are even easier to detect. As a result, velocity of motion can be detected with high precision, not only when time variations in the channel characteristics obtained from a received signal are large, but also in a channel in which there are both a direct wave and a reflected wave, as typified by a Rician channel.

Third Embodiment

The first and second embodiments above directly output the output from the edge decision section 6 as velocity information. Next, however, an embodiment that further improves the precision of detection by averaging the output from the edge decision section 6 will be shown.

Figure 9:
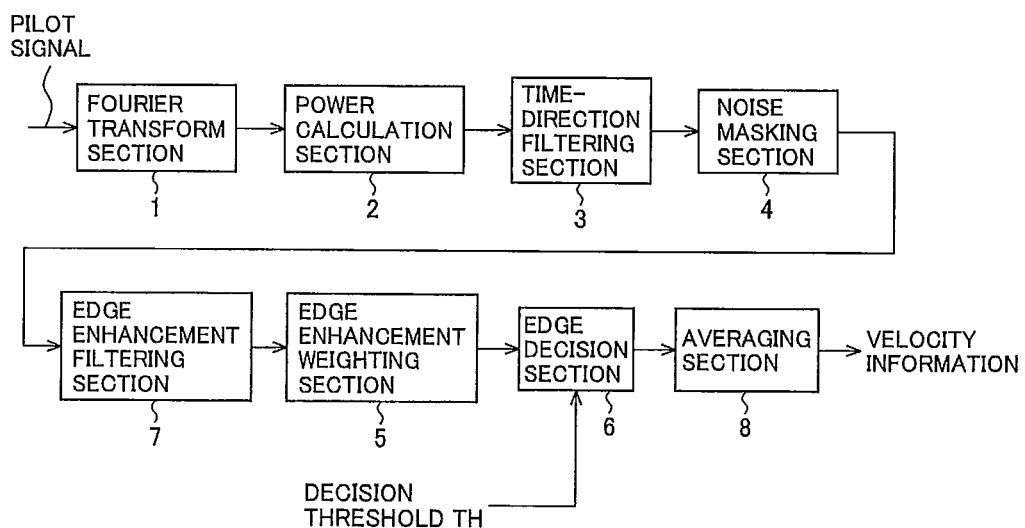
FIG. 9 is a block diagram showing the reception device in a third embodiment of the invention.

FIG. 9 is a block diagram showing a reception device in a third embodiment of the invention. The Fourier transform section 1, power calculation section 2, time-direction filtering section 3, noise masking section 4, edge enhancement weighting section 5, edge decision section 6, and edge enhancement filtering section 7 in FIG. 9 are the same as those shown in the second embodiment. In the third embodiment, an averaging section 8 that receives the output from the edge decision section 6 is added, and the output from the averaging section 8 represents the velocity information.

Next, the operation will be described. Circuit elements with the same reference numerals as in FIG. 8 operate as described in the second embodiment. The averaging section 8 generates velocity information by averaging the output from the edge decision section 6. When errors occur in the output signal of the edge decision section 6, and the errors are scattered around the true velocity, their effect can be reduced by performing the averaging process. When the velocity of motion of the mobile device, for example, a vehicle, varies sufficiently slowly in comparison with the frequency of detection, the detected value should then vary slowly, and the averaging process is effective.

The averaging section 8 may calculate an average value at evenly spaced time intervals, or calculate the average value of the detected results over a fixed time period extending back from the detection of the present detected value.

Instead of an average over a fixed time period, the detected value that occurs with the highest frequency among the detected values over a fixed time period may be output.

As described above, because the results obtained from the decision by the edge decision section 6 are averaged to generate the velocity information, detection result variations associated with erroneous detection in the edge decision section 6 can be reduced, so that velocity of motion can be detected with high precision.

In the case described above, the averaging section 8 is added to the velocity detection device described in the second embodiment. The averaging section 8 may, however, be added to the velocity detection device described in the first embodiment.

REFERENCE CHARACTERS

1 Fourier transform section, 2 power calculation section, 3 time-direction filtering section, 4 noise masking section, 5 edge enhancement weighting section, 6 edge decision section, 7 edge enhancement filtering section, 8 averaging section, 41 high frequency component mean value calculating section, 42 subtraction section, 43 data clipping section, 51 data delaying section, 52 weighting coefficient calculation section, 53 multiplication section.

What is claimed is:

1. A reception device for receiving a transmitted signal into which a pilot signal is inserted at fixed intervals or a frequency division multiplexed signal in which a pilot signal is transmitted on a particular subcarrier, in either case the pilot signal being a known signal at the reception device, and detecting a velocity of motion of the reception device from the transmitted signal, the reception device comprising:
 a Fourier transform section configured to store a channel characteristic obtained from the pilot signal for a prescribed number of symbols and to perform a Fourier transform;
 a power calculation section configured to calculate a power of each Doppler frequency component from an output of the Fourier transform section;
 a time-direction filtering section configured to filter an output of the power calculation section for each Doppler frequency component in the time direction;
 a noise masking section configured to mask a noise component included in an output of the time-direction filtering section;
 an edge enhancement weighting section configured to emphasize power changes between mutually adjacent Doppler frequency components in an output of the noise masking section; and
 an edge decision section configured to generate motion information from an output of the edge enhancement weighting section and a predetermined decision threshold.

2. The reception device of claim 1, further comprising an edge enhancement filtering section provided between the noise masking section and the edge enhancement weighting section, and configured to receive the outputs of the noise masking section in order of Doppler frequency magnitude and perform filtering with a filter having a high-pass characteristic; wherein the edge enhancement weighting section emphasizes the power changes between the mutually adjacent Doppler frequency components in the output of the noise masking section after having been processed by the edge enhancement filtering section.

3. The reception device of claim 1, further comprising an averaging section configured to average the output of the edge decision secition.

4. The reception device of claim 1, wherein the noise masking section comprises:
 a high frequency component mean value calculating section configured to calculate a mean power of those of the noise components and the Doppler frequency components that have absolute values equal to or greater than a predetermined Doppler frequency;
 a subtraction section configured to calculate a difference between an output of the high frequency component mean value calculating section and an input of the noise masking section for each Doppler frequency component; and
 a data clipping section configured to output an output signal of the subtraction section directly when the output signal of the subtraction section is equal to or greater than a predetermined clipping level, and to output a signal equal to the predetermined clipping level when the output signal of the subtraction section is lower than the predetermined clipping level.

5. The reception device of claim 1, wherein the edge enhancement weighting section comprises:
 a weighting coefficient calculation section configured to calculate a weighting coefficient for each Doppler frequency component from each Doppler frequency component and a Doppler frequency component adjacent to said each Doppler frequency component; and
 a multiplication section configured to multiply each Doppler frequency component by the weighting coefficient calculated in the weighting coefficient calculation means, and to output a result of the multiplication.

6. The reception device of claim 5, wherein the weighting coefficient calculation section sets the weighting coefficient to '1' when either one of two mutually adjacent Doppler frequency components is zero, and outputs a result obtained by dividing the Doppler frequency component with the larger value by the Doppler frequency component with the smaller value as the weighting coefficient when neither Doppler frequency component is zero.

7. A reception method for receiving a transmitted signal into which a pilot signal is inserted at fixed intervals or a frequency division multiplexed signal in which a pilot signal is transmitted on a particular subcarrier, in either case the pilot signal being a known signal at a reception device, and detecting a velocity of motion of the reception device from the transmitted signal, the reception method comprising:

a Fourier transform step for storing a channel characteristic obtained from the pilot signal for a prescribed number of symbols and for performing a Fourier transform;

a power calculation step for calculating a power of each Doppler frequency component from an output of the Fourier transform step;

a time-direction filtering step for filtering an output of the power calculation step for each Doppler frequency component in the time direction;

a noise masking step for masking a noise component included in an output of the time-direction filtering step;

an edge enhancement weighting step for emphasizing power changes between mutually adjacent Doppler frequency components in an output of the noise masking step; and an edge decision step for generating motion information from an output of the edge enhancement weighting step and a predetermined decision threshold.

8. The reception method of claim 7, further comprising:

an edge enhancement filtering step performed between the noise masking step and the edge enhancement weighting step, for receiving outputs of the noise masking step in order of Doppler frequency magnitude and performing filtering with a filter having a high-pass characteristic; wherein the edge enhancement weighting step emphasizes the power changes between the mutually adjacent Doppler frequency components in the output of the noise masking section after having been processed by the edge enhancement filtering step.

9. The reception method of claim 7, further comprising an averaging step for averaging the output of the edge decision step.

10. The reception method of claim 7, wherein the noise masking step comprises:

a high frequency component mean value calculating step for calculating a mean power of absolute values of the noise components and the Doppler frequency components that are equal to or greater than a predetermined Doppler frequency;

a subtraction step for calculating a difference between an output of the high frequency component mean value calculating step and an input of the noise masking step for each Doppler frequency component ; and a data clipping step for outputting an output signal of the subtraction step directly when the output signal of the subtraction step is equal to or greater than a predetermined clipping level, and for outputting a signal equal to the clipping level when the output signal of the subtraction step is lower than the clipping level.

11. The reception method of claim 7, wherein the edge enhancement weighting step comprises:

a weighting coefficient calculation step for calculating a weighting coefficient for each Doppler frequency component from each Doppler frequency component and a Doppler frequency component adjacent to said each Doppler frequency component; and a multiplication step for multiplying each Doppler frequency component by the weighting coefficient calculated in the weighting coefficient calculation step to generate an output signal, and for outputting a result of the multiplication.

12. The reception method of claim 11, wherein the weighting coefficient calculation step sets the weighting coefficient to '1' when one of two mutually adjacent Doppler frequency components is zero, and outputs a result obtained by dividing the Doppler frequency component with the larger value by the Doppler frequency component with the smaller value as the weighting coefficient when neither Doppler frequency component is zero.

* * * * *